May 8, 1928.
A. ZADEK
1,668,930
NURSERY BATH THERMOMETER
Filed Oct. 12, 1927
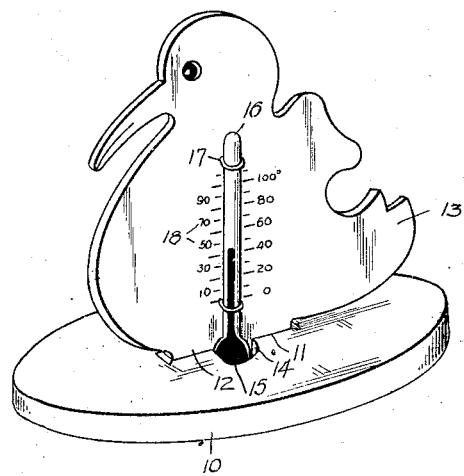
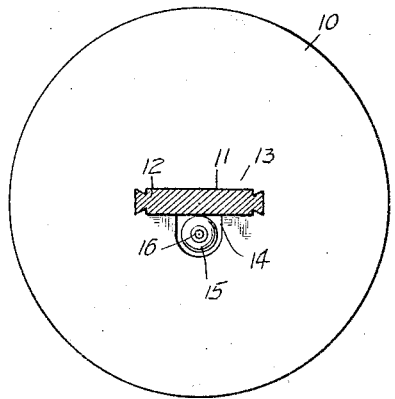
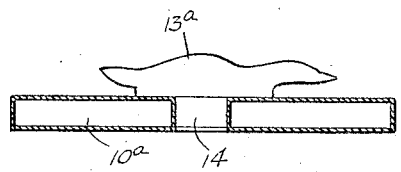
ARTHUR ZADEK
INVENTOR
BY
his ATTORNEY.

Patented May 8, 1928.

1,668,930

UNITED STATES PATENT OFFICE.

ARTHUR ZADEK, OF NEW YORK, N. Y.

NURSERY-BATH THERMOMETER.

Application filed October 12, 1927. Serial No. 225,827.

This invention relates to improvements in the construction of what are known as bath thermometers and has for its object to provide an article of this character especially adapted for use in the nursery or children's bath.

A further object of the invention is to provide the thermometer proper with a holder which when placed upon the water will float and at the same time immerse the bulb of the thermometer beneath the surface of the water.

A still further object of the present invention is to provide novel means of attaching the upright thermometer holder to the base portion or float thereof.

I accomplish these objects by means of the device described in the following specification and set forth in the claims and illustratively exemplified in the accompanying drawings in which Figure 1 is a perspective view of my improved bath thermometer; Figure 2 is a detail view of the base of the float with parts in section and Figure 3 is a modified form of base or float.

Referring to the drawings, 10 denotes a wood base or float, preferably disc shaped as illustrated in the drawings, having diametrically disposed slot 11 projecting to points on each side of the center, each end of the slot 11 being mortised to receive a dovetail tenon 12 of an upright standard 13, the material adjacent the tenon 12 being projected thereover to provide a shoulder 13$^a$ to abut the face of the base 10 when the tenon is inserted. One wall of the slot 11 at the center thereof is semicircularly recessed to provide an opening 14 into which the bulb 15 of a thermometer 16 projects, the stem thereof being carried on the face of the standard 13 by means of staples 17 which embrace the stem at spaced intervals and are driven into the wood standard 13 for support. The standard 13 of course may be of wood cut out of any shape, the illustration showing a duckling which may be decorated to attract a child and upon the surface of the body at each side of the stem of the thermometer 16 suitable degrees 18 are indicated.

As disclosed in Figure 3 the device may be made of hollow construction, e. g. celluloid, in which case the standard 13$^a$ is cemented to the hollow base 10$^a$.

In use the device is placed upon the surface of water in the bath receptacle and because of its buoyancy will float, the weight of the standard 13 being sufficient however to cause the base 10 to ride low in the water thereby submerging the bulb 15 of the thermometer 16 and permitting the same to render an accurate reading of the temperature of the water being tested. The device may be allowed to remain on the water during the taking of the bath, both to render amusement for the child and to indicate to the nurse when the water has become too cool for the child's comfort and safety.

What I claim and desire to secure by Letter Patent is:

1. A bath thermometer, comprising a buoyant flat disc shaped base member having a slot therethrough provided with mortised ends and a recess at one side, an upright standard having its end tenoned to fit the slot and mortised ends thereof, a portion of the upright being provided with a shoulder to abut the face of the base when the upright is inserted, and a thermometer tube carried by the face of the upright and having its bulb projecting into the recessed portion of the slot in the base.

2. A bath thermometer, as claimed in claim 1 in which the standard is outlined to represent a figure, and the surface thereof at opposite sides of the thermometer tube is graduated to provide readings therefor.

In testimony whereof I affix my signature.

ARTHUR ZADEK.